United States Patent
Liu

(10) Patent No.: US 7,418,266 B2
(45) Date of Patent: Aug. 26, 2008

(54) METHOD FOR CONTROLLING TIMING IN A COMMUNICATIONS CHANNEL

(75) Inventor: Jung-Tao Liu, Madison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 239 days.

(21) Appl. No.: 10/675,346

(22) Filed: Sep. 30, 2003

(65) Prior Publication Data

US 2005/0070292 A1 Mar. 31, 2005

(51) Int. Cl.
*H04Q 7/20* (2006.01)
(52) U.S. Cl. .................. 455/450; 455/436; 455/442; 455/447; 455/453
(58) Field of Classification Search .......... 455/434, 455/435.1–453, 515, 509, 410–411, 412.2, 455/415, 428, 433, 418–419, 412.1, 412.3, 455/45
See application file for complete search history.

(56) References Cited

U.S. PATENT DOCUMENTS

| | | | | |
|---|---|---|---|---|
| 6,078,572 | A * | 6/2000 | Tanno et al. | 370/335 |
| 6,298,239 | B1 * | 10/2001 | Yonemoto et al. | 455/466 |
| 2004/0131106 | A1 * | 7/2004 | Kanterakis | 375/141 |
| 2004/0219919 | A1 * | 11/2004 | Whinnett et al. | 455/442 |
| 2004/0219920 | A1 * | 11/2004 | Love et al. | 455/442 |
| 2005/0020272 | A1 * | 1/2005 | Barve | 455/450 |
| 2005/0026642 | A1 * | 2/2005 | Lee et al. | 455/522 |
| 2005/0136923 | A1 * | 6/2005 | Alapuranen et al. | 455/434 |

OTHER PUBLICATIONS

Power Point Presentation entitled, "Uplink Enhancements for Dedicated Transport Channels—Concepts and Fundamentals," 10 pgs., Oct. 8-9, 2002.
Power Point Presentation entitled, "UL Enhancements High Level Considerations," 8 pgs., Oct. 8-9, 2002.
Technical Specification entitled, "3$^{rd}$ Generation Partnership Project; Technical Specification Group Radio Access Network; Physical channels and mapping of transport channels onto physical channels," 51 pgs. (FDD) (Release 6) Dec. 2003.
Technical Document entitled, "Timing Relationship for Enhanced Uplink," 2 pgs., Jan. 7-10, 2003.
Technical Document entitled, "Node B Controlled Time and Rate Scheduling," 3 pgs., May 19-23, 2003.

* cited by examiner

*Primary Examiner*—Duc Nguyen
*Assistant Examiner*—Dai A Phuong

(57) ABSTRACT

A method for controlling the flow of information on a high-speed channel between a UE and a Node B is provided. Timing of the high-speed channel is based on timing associated with a low-speed channel and a time at which a grant signal is received from the Node B. Upon receiving a grant signal, the UE adds a preselected duration of time to the timing of the low-speed channel to provide timing on the high-speed channel, where the preselected duration of time is selected to maintain substantial orthogonality between the high-speed and low-speed channels.

2 Claims, 4 Drawing Sheets

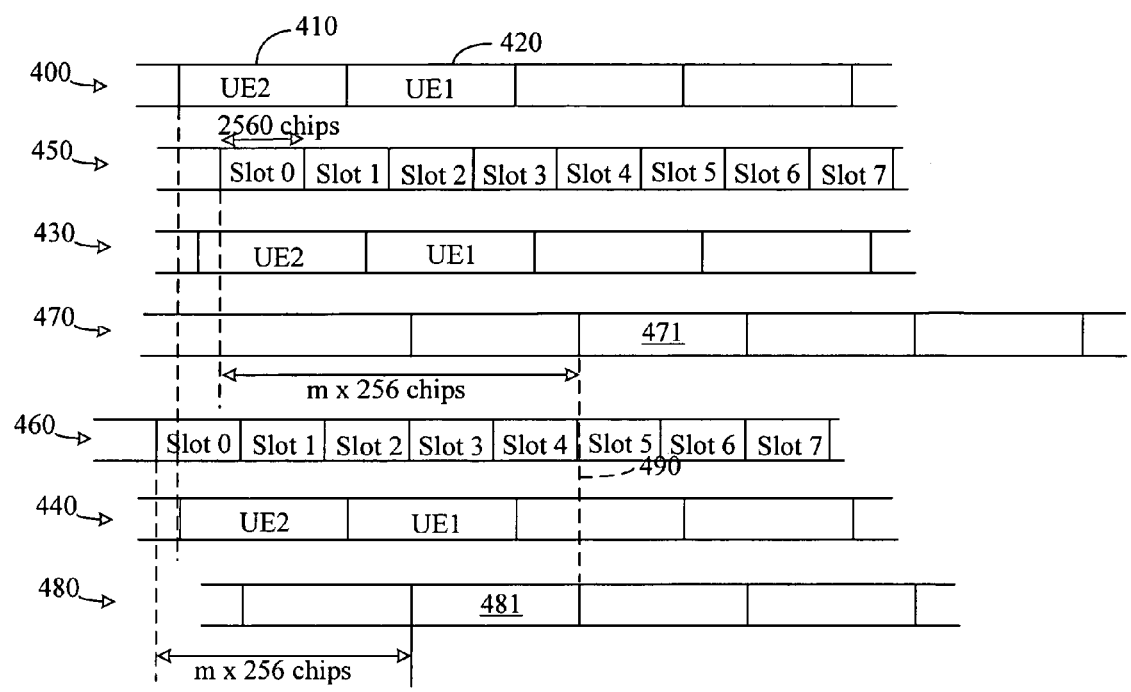

METHOD FOR CONTROLLING TIMING IN A COMMUNICATIONS CHANNEL

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a system typically includes a plurality of Node Bs (e.g., base stations) distributed within an area to be serviced by the system. Various users within the area, fixed or mobile, may then access the system and, thus, other interconnected telecommunications systems, via one or more of the Node Bs. Typically, a UE (e.g., a user) maintains communications with the system as the user passes through an area by communicating with one and then another Node B, as the user moves. The user may communicate with the closest Node B, the Node B with the strongest signal, the Node B with a capacity sufficient to accept communications, etc.

Commonly, each Node B is constructed to process a plurality of communications sessions with a plurality of users. In this way, the number of Node Bs may be limited while still providing communications capabilities to a large number of substantially simultaneous users.

In at least some modes of operation, the Node B schedules each of the UEs to transmit information to the Node B within their own preselected time frame. Scheduling the UEs to transmit at a preselected time will not, however, result in each UE transmitting at precisely the desired time where the operations of the UE and the Node B are mistimed or misaligned relative to each other.

Moreover, mistiming between various UEs may result in two or more UEs providing transmissions that, at least partially, overlap with one another. Overlapping transmissions are undesirable in that they may interfere with one another. In systems that are transmitting high-speed data, the interference arising from overlapping transmissions may degrade the signals sufficiently far to produce errors in the information, which will necessitate the information being resent. Resending information, of course, will slow the overall transfer rate, reducing high-speed operations to unacceptable levels.

The present invention is directed to overcoming, or at least reducing, the effects of one or more of the problems set forth above.

SUMMARY OF THE INVENTION

In one aspect of the instant invention, a method is provided. The method comprises determining timing associated with a first channel. A grant signal permitting transmission of information over a second channel is received, and information is then transmitted over the second channel at a time related to the timing of the first channel and a time at which the grant signal is received.

In yet another aspect of the instant invention, a method is provided. The method comprises determining timing associated with a first channel. A grant signal permitting transmission of information over a second channel is received, and information is transmitted over the second channel at a time near a preselected target time while maintaining substantial orthogonality with the timing of the first channel.

BRIEF DESCRIPTION OF THE DRAWINGS

The invention may be understood by reference to the following description taken in conjunction with the accompanying drawings, in which like reference numerals identify like elements, and in which:

FIG. 4 is a timing diagram illustrating the interoperation of the Node B and two UEs of FIGS. 1 and 2.

Figure 1:
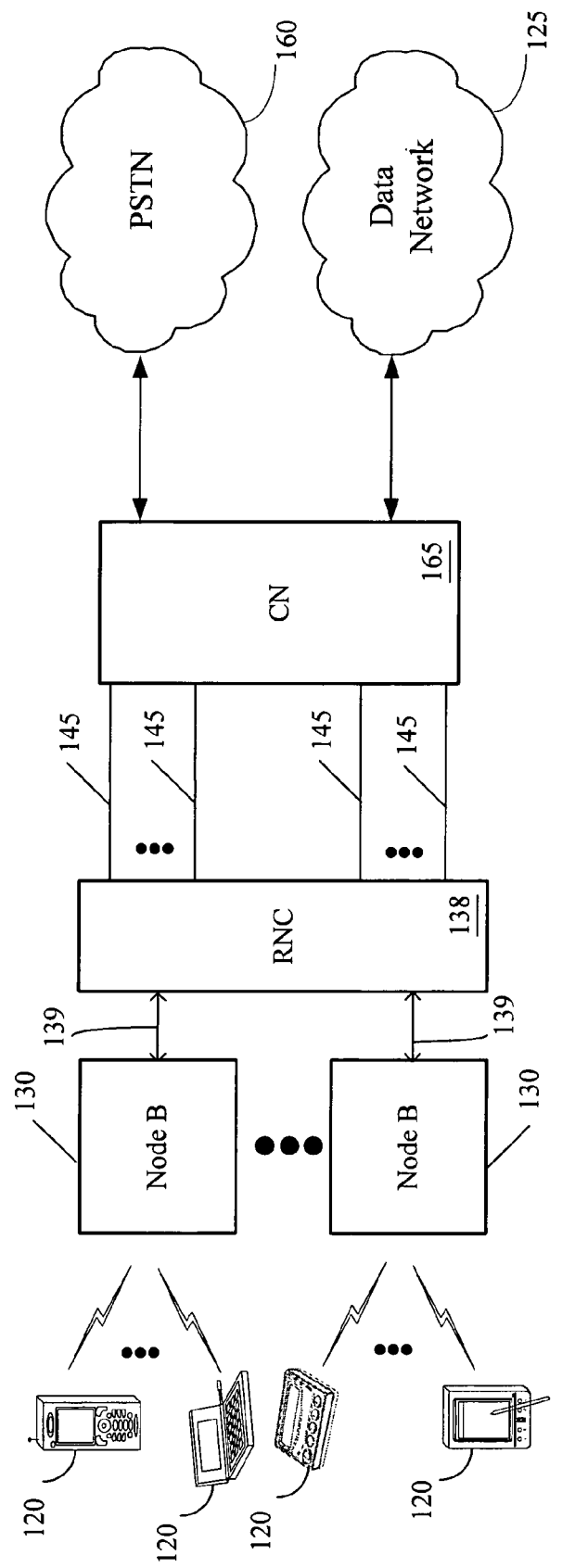
FIG. 1 is a block diagram of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a communications system 100 is illustrated, in accordance with one embodiment of the present invention. For illustrative purposes, the communications system 100 of FIG. 1 is a Universal Mobile Telephone System (UMTS), although it should be understood that the present invention may be applicable to other systems that support data and/or voice communication. The communications system 100 allows one or more UEs 120 to communicate with a data network 125, such as the Internet, through one or more Node Bs 130. The UE 120 may take the form of any of a variety of devices, including cellular phones, personal digital assistants (PDAs), laptop computers, digital pagers, wireless cards, and any other device capable of accessing the data network 125 through the Node B 130.

In one embodiment, a plurality of the Node Bs 130 may be coupled to a Radio Network Controller (RNC) 138 by one or more connections 139, such as T1/EI lines or circuits, ATM circuits, cables, optical digital subscriber lines (DSLs), and the like. Although only two RNCs 138 are illustrated, those skilled in the art will appreciate that a plurality of RNCs 138 may be utilized to interface with a large number of Node Bs 130. Generally, the RNC 138 operates to control and coordinate the Node Bs 130 to which it is connected. The RNC 138 of FIG. 1 generally provides replication, communications, runtime, and system management services. The RNC 138, in the illustrated embodiment handles calling processing functions, such as setting and terminating a call path and is capable of determining a data transmission rate on the forward and/or reverse link for each UE 120 and for each sector supported by each of the Node Bs 130.

The RNC 138 is, in turn, coupled to a Core Network (CN) 165 via a connection 145, which may take on any of a variety of forms, such as T1/EI lines or circuits, ATM circuits, cables, optical digital subscriber lines (DSLs), and the like. Generally the CN 140 operates as an interface to a data network 125 and/or to a public telephone system (PSTN) 160. The CN 140 performs a variety of functions and operations, such as user authentication, however, a detailed description of the structure and operation of the CN 140 is not necessary to an understanding and appreciation of the instant invention. Accordingly, to avoid unnecessarily obfuscating the instant invention, further details of the CN 140 are not presented herein.

The data network 125 may be a packet-switched data network, such as a data network according to the Internet Protocol (IP). One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks, and the like.

As utilized herein, a "data network" may refer to one or more communication networks, channels, links, or paths, and systems or devices (such as routers) used to route data over such networks, channels, links, or paths.

Thus, those skilled in the art will appreciate that the communications system 100 facilitates communications between the UEs 120 and the data network 125. It should be understood, however, that the configuration of the communications system 100 of FIG. 1 is exemplary in nature, and that fewer or additional components may be employed in other embodiments of the communications system 100 without departing from the spirit and skill of the instant invention.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Figure 2:
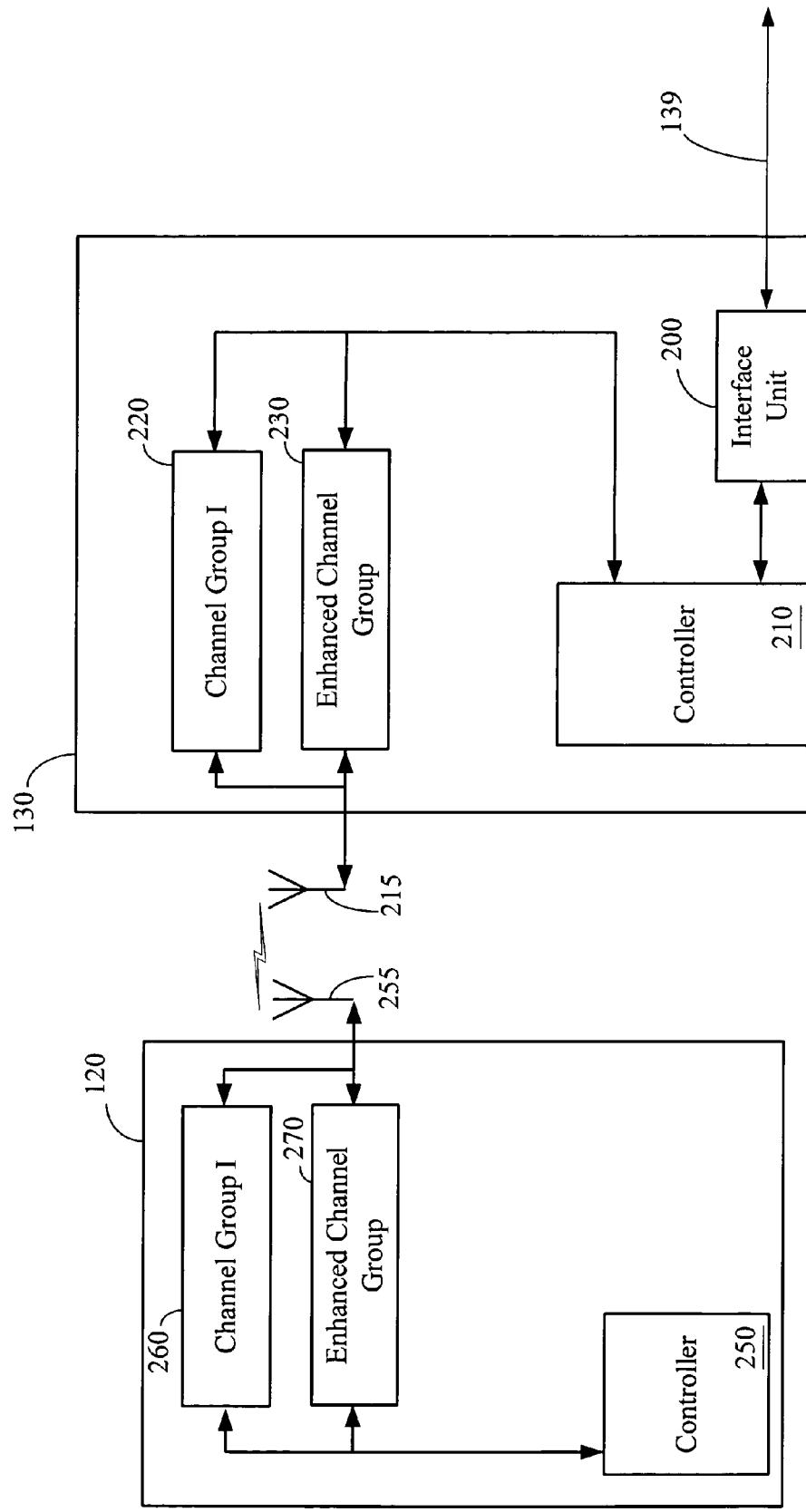
FIG. 2 depicts a block diagram of one embodiment of a Node B and a UE used in the communications system of FIG. 1.

Referring now to FIG. 2, a block diagram of one embodiment of a functional structure associated with an exemplary Node B 130 and UE 120 is shown. The Node B 130 includes an interface unit 200, a controller 210, an antenna 215 and a plurality of channel groups: a first channel group 220 and an enhanced channel group 230. Both of the channel groups 220, 230 are comprised of a shared channel, a data channel, and a control channel. Generally, the enhanced channel group is used for high-speed data transfers in a scheduled mode of operation. The interface unit 200, in the illustrated embodiment, controls the flow of information between the Node B 130 and the RNC 138 (see FIG. 1). The controller 210 generally operates to control both the transmission and reception of data and control signals over the antenna 215 and the plurality of channels 220, 230 and to communicate at least portions of the received information to the RNC 138 via the interface unit 200.

The UE 120 shares certain functional attributes with the Node B 130. For example, the UE 120 includes a controller 250, an antenna 255, a first channel group 260 and an enhanced channel group 270. Both of the channel groups 260, 270 are comprised of a shared channel, a data channel, and a control channel. The controller 250 generally operates to control both the transmission and reception of data and control signals over the antenna 255 and the plurality of channel groups 260, 270.

Normally, the channels 260, 270 in the UE 120 communicate with the corresponding channels 220, 230 in the Node B 130. Under the operation of the controllers 210, 250 the channels 220, 260; 230, 270 are used to effect a controlled time scheduling for communications from the UE 120 to the Node B 130. For example, the control channel in the enhanced channel group 270 is generally used by the UE 120 to request permission to transmit data and/or control information to the Node B 130. The shared channel in the enhanced group 230 is used by the Node B 130 to notify the UE 120 of the circumstances under which it may transmit to the Node B 130 via the data and control channels of the enhanced channel group 270. The process for effecting such a communication session is described in greater detail in conjunction with the flow diagram of FIG. 3 and the timing diagram of FIG. 4.

Generally, the UE has a first and second status in which it may operate in the network. In the first status, the UE 120 is in contact with a plurality of Node Bs 130, which is sometimes referred to as a soft handoff ("SHO"). In the second status, the UE 120 is in contact with only one of the Node Bs 130, which is called the serving Node B. The methodology described herein is a method to coordinate UE transmissions on the uplink when UEs are not in SHO. The method is referred to as "time scheduled" mode of operation. The following description and drawings are presented with reference to the UE 120 entering and leaving the SHO status, and being in the time scheduled mode of operation.

Figure 3:
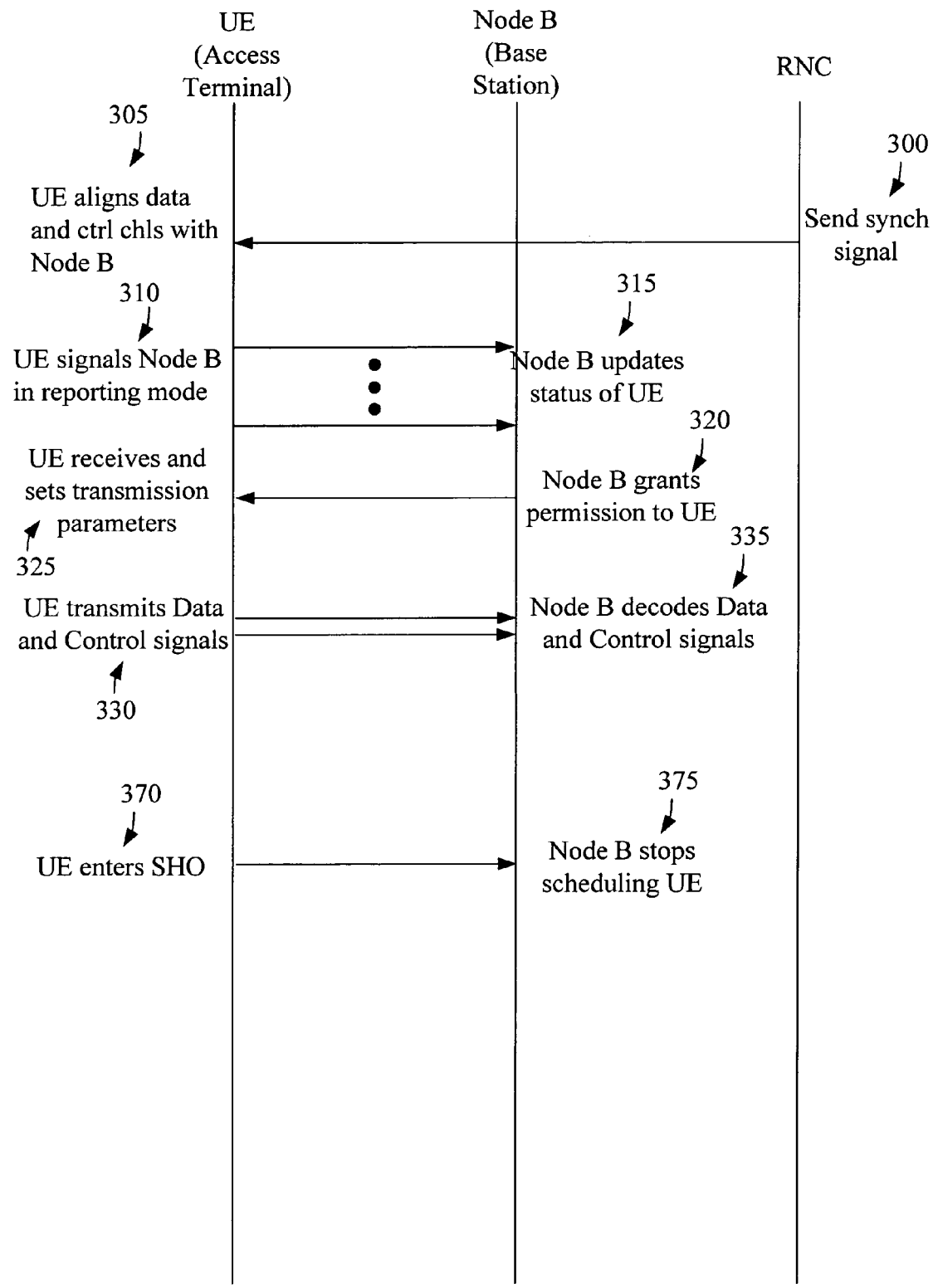
FIG. 3 is a flow diagram illustrating the interoperation of the Node B and the UE of FIGS. 1 and 2.

Turning now to FIG. 3, a flow diagram illustrating the interoperation of one of the Node Bs 130 and one of the UEs 120 of FIGS. 1 and 2 is shown. In the flow diagram of FIG. 3, the exemplary UE 120 has entered the scheduled mode of operation, and thus, the RNC 138 provides a signal (at 300) through the Node B 130 to align or synchronize the operation of the Node B 130 and the UE 120. In the illustrated embodiment, different Node Bs 130 that are assigned to different RNCs 138 are operating with different system clocks from the instant RNC 138 and Node B 130. Therefore, to insure proper timing of signals between the Node B 130 and the UE 120, the first operation is to synchronize at least the communications between the two devices. In the illustrated embodiment, the UE 120 (at 305) responds to the synchronization signal by aligning (or realigning) the timing of signals to be delivered over the group I channels 260. In alternative systems that utilize a universal clock signal, synchronization may not be necessary when the UE 120 first enters the scheduled mode of operation with the Node B 130, as it may already be synchronized.

The UE 120 has voice and/or data signals that it desires to transmit to the Node B. However, before the UE 120 is allowed to transmit data/voice to the Node B 130, it must first request, and be granted, permission. Accordingly, the UE 120 (at 310) periodically sends a reporting signal over the control channel in the enhanced channel group 270 indicating that it has data/voice to be transmitted to the Node B 130. The Node B 130 (at 315) receives the signal on its control channel in the enhanced channel group 240, updates the status of the UE 120, indicating that the UE 120 is in the scheduled mode of operation and desires to transmit data/voice information. The Node B 130 also determines certain information from parameters, such as quality and strength, of the signal received from the UE 120. For example, based on the quality and strength of the signal, the Node B 130 may determine that the UE 120 needs to adjust its transmitting power (increase or decrease).

The Node B 130 (at 320) responds to the request from the UE 120 by delivering a signal over the shared channel in the enhanced channel group 220, granting permission to the Node B 130 to deliver its voice/data signal over the data channel in the enhanced channel group 270. The Node B 130 grants permission to a selected one of the UEs 120 based on information obtained on the control channel in the enhanced channel group 240 from the UE 120 about the available power each UE 120 has for transmission and the data/voice buffer size for each UE 120. The permission granting signal delivered by the Node B 130 may include additional information, such as the time at which the UE 120 is permitted to transmit its voice/data and the period in which it must complete, or otherwise cease, the transmission. In the illustrated embodiment, the Node B 130 grants permission to the UE 120 to provide its data/voice signal, such as a packet of data, during a subsequent clock cycle, such as the next sub-frame in the illustrated embodiment.

Additionally, the Node B 130 may also provide information regarding the parameters of the data/voice signal to be provided by the UE 120. For example, the Node B 130, using information derived from a prior signal received from the UE 120 may indicate that the UE 120 should adjust the power and/or timing of its signal. Generally, the Node B 130 may request that the UE 120 adjust the parameters of its signal so as to conserve power within the UE 120, improve the quality of the signal received from the UE 120, and the like. For example, increasing the power of a weak signal may improve the quality of the transmission. Alternatively, decreasing the power of an overly strong signal may conserve power with the UE 120 without a corresponding loss of quality in the transmitted signal. Using information derived from a prior signal received from the UE 120, the Node B 130 can also derive information about the data rate, transmission duration, modulations and coding rate that a UE 120 should use when it starts the uplink data transmission. Thus, the Node B 130 may provide some, all or none of this information to the UE 120 in the signals delivered over the shared channel in the enhanced channel group 230.

The UE 120 (at 325) examines the signal from the Node B 130 and determines which, if any, of its transmitting parameters need to be adjusted. In some circumstances, the UE 120 may heed any and all requests to modify its transmission. In other instances, the UE 120 may elect to override a request from the Node B 130, and transmit its signal using different parameters. For example, a UE 120 may be rated to transmit at a certain preselected data rate that requires more power than it is currently available to the UE 120. In this case, the UE 120 may decide to transmit with a lower data rate than is granted by the Node B 130. The UE 120, in this case, is responsible of informing the Node B 130 of the new transmitting parameters through the control channel in the enhanced channel group 270, 230. Similarly, for example, if the UE 120 is granted permission to transmit a large amount of data, but then determines that it does not have that much data to transmit, then the UE 120 can change the transmit parameters in order to transmit its data. For example, the UE 120 may reduce the transmission time interval, or the UE 120 may reduce the modulation size, or the UE 120 may decrease the coding rate when transmitting the data. In this case, UE 120 is again responsible for notifying the serving Node B 130 of any changes it made through the control channel in the enhanced channel group 270, 230.

At the appointed time, the UE 120 (at 330) begins transmitting its voice/data signal or packet over the data channel in the enhanced channel group 270. At substantially the same time, the UE 120 may also transmit a signal over the control channel in the enhanced channel group. The UE 120 may use the control channel to indicate parameters associated with the signals being provided over the data channel. For example, at least in those instances where the UE 120 has overridden the parameters suggested by the Node B 130, it is useful for the UE 120 to provide information regarding the parameters that it used in transmitting the voice/data signals on the data channel. Thus, the Node B 130 may use the information provided on the control channel to decode information received on the data channel.

The Node B 130 (at 335) receives the information provided over both the data and control channels. The information on the control channel is decoded and used to decode the voice/data signal provided over the data channel. The decoded voice/data signals are then forwarded through the interface unit 200 to the various components of the system 100.

Ultimately, the UE 120 may travel to a new location where it is in communication with more than one of the Node Bs 130. At this point, the UE 120 will leave the scheduled mode of operation and enter the soft handoff mode of operation where the scheduled mode of operation is not supported. This change in status is communicated to the Node B 130 (at 370) by the UE 120 delivering a preselected signal over the control channel. The Node B (at 375) responds to the signal that the UE 120 is no longer in the scheduled mode of operation by discontinuing any scheduling of the UE 120.

Turning now to FIG. 4, a timing diagram illustrating scheduling and transmission of data and control signals between the Node B 130 and a pair of UEs, UE1 and UE2, is illustrated. Line 400 represents the timing of grant signals delivered from the Node B 130 over its shared channel in the enhanced channel group 230. In the illustrated embodiment a first grant signal 410 is delivered to UE2 and a second grant signal 420 is delivered to UE1. Reception of the grant signals at UE1 and UE2 is represented at lines 430, 440, respectively. It should be noted that the reception time at UE1 and UE2 is slightly different in the illustrated embodiment. Because UE1 and UE2 are mobile devices and their position relative to the Node B 130 may be different and varying, propagation delays may affect the time at which the grant signals are received at the variously positioned mobile devices UE1, UE2.

The timing of transmissions over the data and control channels in the enhanced channel groups 270 of UE1 is governed by two fundamental rules. First, the transmission from UE1 over the data and control channels of the enhanced channel group 270 should not have substantial overlap with the transmission from UE2 over its data and control channels of its enhanced channel group 270, so as to avoid undue interference therebetween. Second, the transmission from UE1 over the data and control channels of the enhanced channel group 270 should have a preselected alignment relative to other data and control signal transmissions by UE1, such as those transmissions occurring over the data and control channels of the channel group I 260. In particular, it is desirable that orthogonality be maintained between the enhanced channel group transmissions and the channel group I transmissions.

The timing of transmissions on the data channels of the channel group I 260 for UE1 and UE2 are shown on lines 450, 460, respectively. The channel group I 260 is separated into a series of slots (1-12) with each slots being further divided into 256 chips. Those skilled in the art will appreciate that these divisions and subdivisions are merely exemplary in nature and could be varied substantially without departing from the spirit and scope of the instant invention. It will be appreciated that the transmissions on the control and data channels of the channel group I 260 are not time scheduled, and thus, may occur at the same time or at least substantially overlap. Moreover, while the channel group I signals are synchronized with the operations of the UE 120 in which they are generated, they will vary with respect to other UEs 120. That is, there will be a known variation between transmissions by UE1 and UE2 on their respective channel group I 260.

The timing of transmissions on the data channels of the enhanced channel group 270 for UE1 and UE2 are shown on lines 470, 480, respectively. Signals transmitted on the enhanced channel group 270 are timed relative to the channel group I signals. For example, a signal 471 on the enhanced data channel of UE1 is delivered at a time $\Delta 1$ after the beginning of the slot 0 transmission on the data channel of the channel group I 260 of UE1. By carefully selecting $\Delta 1$, the signal 471 may be delivered at a preselected time relative to similar transmissions by UE2 and at a preselected time relative to the transmissions on the channel group I 260 of UE1. To maintain substantial orthogonality between the channel group I signals and the signal 471, the time $\Delta 1$ is selected to be an integer multiple of 256 chips (i.e., $\Delta 1 = m_1 \times 256$).

Similarly, a signal 481 on the enhanced data channel of UE2 is delivered at a time $\Delta 2$ after the beginning of the slot 0 transmission on the data channel of the channel group I 260 of UE2. By carefully selecting $\Delta 2$, the signal 481 may be delivered at a preselected time relative to the signal 481 and at a preselected time relative to the transmissions on the channel group I 260 of UE2. To maintain substantial orthogonality between the channel group I signals and the signal 481, the time $\Delta 2$ is selected to be an integer multiple of 256 chips (i.e., $\Delta 2 = m_2 \times 256$).

Thus, as can be seen by dashed line 490, the signals 481, 471 are substantially synchronized so that they are sequentially delivered with no substantial overlapping. Those skilled in the art will appreciate that potential overlapping could be further reduced by altering the granularity of the $\Delta 1$ and $\Delta 2$ adjustments to a value of less than 256 chips. There is a tradeoff, however, between overlap and orthogonality.

Those skilled in the art will appreciate that the various system layers, routines, or modules illustrated in the various embodiments herein may be executable control units (such as the controllers 210, 250 (see FIG. 2)). The controllers 210, 250 may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the controllers 210, 250 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

The invention claimed is:

1. A method, comprising:
   determining timing associated with a first channel;
   receiving a grant signal permitting transmission of information over a second channel; and
   transmitting information over the second channel at a time related to the timing of the first channel and a time at which the grant signal is received, wherein transmitting information over the second channel further comprises transmitting information over the second channel a preselected duration of time after the timing associated with the first channel, and wherein transmitting information over the second channel a preselected duration of time after the timing associated with the first channel further comprises determining the preselected duration of time by multiplying a variable (m) times a constant, wherein the constant is related to the timing of the first channel, and wherein determining the preselected duration of time further comprises multiplying a variable (m) times a constant, wherein the constant is about 10% of a period of time associated with the timing of the first channel.

2. A method, comprising:
   determining timing associated with a first channel;
   receiving a grant signal permitting transmission of information over a second channel; and
   transmitting information over the second channel at a time near a preselected target time while maintaining substantial orthogonality with the timing of the first channel, wherein transmitting information over the second channel further comprises transmitting information over the second channel a preselected duration of time after the timing associated with the first channel, wherein transmitting information over the second channel a preselected duration of time after the timing associated with the first channel further comprises determining the preselected duration of time by multiplying a variable (m) times a constant, wherein the constant is related to the timing of the first channel, wherein determining the preselected duration of time further comprises multiplying a variable (m) times a constant, wherein the constant is a portion of time associated with the timing of the first channel, and wherein determining the preselected duration of time further comprises multiplying a variable (m) times a constant, wherein the constant is about 10% of a period of time associated with the timing of the first uplink channel.

* * * * *